United States Patent Office 3,637,597
Patented Jan. 25, 1972

3,637,597
WATER DISPERSIBLE, CROSSLINKING RESINS VIA THE INCORPORATION OF PENDANT MANNICH ADDUCT UNITS THEREIN
George Jalics, Rocky River, Ohio, assignor to SCM Corporation, Cleveland, Ohio
No Drawing. Filed Oct. 18, 1968, Ser. No. 768,924
Int. Cl. C08f 3/40, 27/08
U.S. Cl. 260—65
10 Claims

ABSTRACT OF THE DISCLOSURE

There is presented certain water dispersible polymers and coating compositions suitable for coating, impregnating, and electrocoating, and an improvement in process for producing the water dispersible polymers which comprises including in the polymer sufficient pendant Mannich adduct units for rendering the polymer dispersible in water. The pendant Mannich adduct units are represented by at least one of the following formulas:

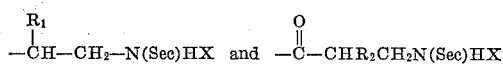

wherein $R_1$ represents a carboxyl, aldehyde, or carboxylic acid ester group, $R_2$ represents hydrogen, a halide, or lower alkyl radical, $N(Sec)$ represents a lower alkyl, cycloaliphatic, aromatic, or heterocyclic secondary amine, and HX represents a salt-forming acid.

---

This invention relates to polymers having attached thereto a sufficient number of pendant Mannich adduct units for rendering the polymers dispersible in water. On the application of heat the polymer crosslinks to form a thermoset resin.

By the term "Mannich adduct unit," I refer to adduct units pendant from the primary monomer and primary polymer structures, which adduct units are produced according to the well-known Mannich reaction. Typically the Mannich reaction is a condensation of ammonia or a primary or secondary amine, preferably in salt form, such as the amine hydrochloride or the like, with formaldehyde and a compound having at least one hydrogen atom of pronounced reactivity. A description of the Mannich reaction is found in the text Organic Reactions, vol. 1, 1942, pages 303–342; publisher, John Wiley & Sons Inc; author, Blicke, F. F. This text may hereinafter be referred to as the "reference text," and is hereby incorporated by reference.

Advantages of the polymers produced by this invention include water dispersibility, crosslinking on the application of heat, without the addition of extraneous crosslinking agents, and sufficient electronegativity for forming a coating composition which may be applied by electrocoating techniques.

Broadly, the invention relates to an improvement in process for producing polymers which comprises including in the polymer sufficient pendant Mannich adduct units for rendering the polymer dispersible in water. The pendant Mannich adduct units are represented by at least one of the following formulas:

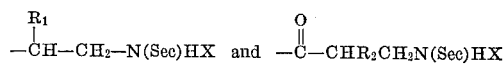

wherein $R_1$ represents a carboxyl, aldehyde, or carboxylic acid ester group, $R_2$ represents hydrogen, a halide, or lower alkyl radical, $N(Sec)$ represents a lower alkyl, cycloaliphatic, aromatic, or heterocyclic secondary amine, and HX represents a salt-forming acid.

While not intending to be bound by theory, I submit the following equations with supplemental notations to illustrate the general reactions included in the process and to aid in the understanding of the description of this invention. These equations, I believe, represent a specific embodiment of this invention and therefore are not intended to restrict the scope of this invention.

EQUATIONS

Polymerizable Monomer         Polymerizable Unsaturated Compound

1. 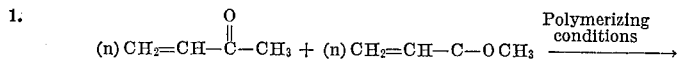

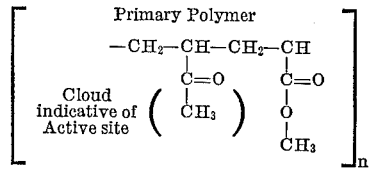

2. 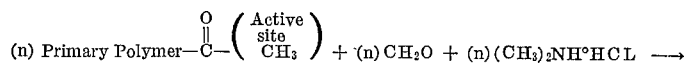

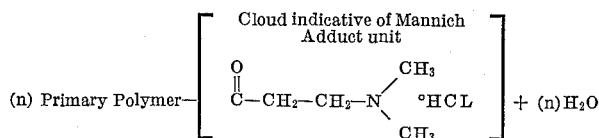

3. 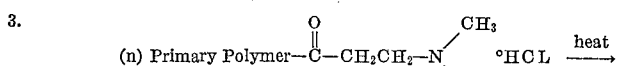

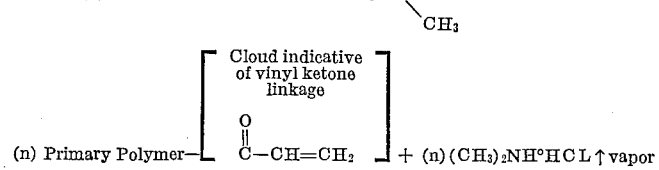

EQUATION

4. 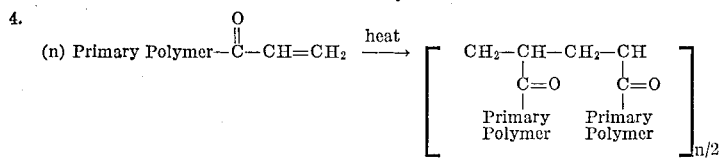

"$n$" in the above equations represents a number between about 5 and 150.

Equation 1 shows the copolymerization of methylvinyl ketone and methyl acrylate to form a primary polymer. Equation 2 illustrates the primary polymer of Equation 1, having an active site, reacted with the components of the Mannich reaction; i.e., formaldehyde, a secondary amine, and a salt-forming acid, to yield the water dispersible polymer. Equation 3 exemplifies the destruction of the Mannich adduct units, on the application of heat, for rendering the polymer water-insoluble. Equation 4 demonstrates the self-crosslinking mechanism of the polymer of Equation 3, via the vinyl ketone linkage for yielding a thermoset resin.

By a polymer I refer to and include homopolymers, copolymers, and interpolymers having included therein the pendant Mannich adduct units. By a primary polymer I refer to the polymers produced by reacting a mixture of at least one polymerizable unsaturated compound and at least one polymerizable monomer under polymerizing conditions as illustrated in Equation 1. (Primary polymers do not have Mannich adduct units). In forming a homopolymer, I exclude the polymerizable unsaturated compound. Primary copolymers and interpolymers are formed by reacting at least one polymerizable monomer with at least one polymerizable unsaturated compound. The primary polymers employed in this invention can have a molecular weight from about 300 to 100,000. Preferably, the primary polymer produced has a molecular weight of between about 2,000 to about 20,000 for application as a coating.

By "polymerizing conditions," I mean that the reaction conditions are suitable for polymerizing a polymerizable unsaturated compound and at least one polymerizable monomer, or merely polymerizing the polymerizable monomer itself. Generally the polymerization is accomplished in a conventional manner. For example, I can use conventional free-radical polymerization techniques and I can polymerize in emulsions or in solvents to produce the primary polymer. Generally the polymerization is carried out with conventional catalysts in conventional equipment which is operated under conventional temperatures and pressures.

The Mannich adduct units, such as those illustrated in Equation 2, can be attached to the primary polymer in at least two ways. One way is by reacting the primary polymer in a Mannich reaction to attach the Mannich adduct units thereto, and the other contemplates reacting a polymerizable monomer in a Mannich reaction to attach the Mannich adduct units thereto and then subsequently polymerizing the reacted monomer for forming the polymer. Generally the polymerization of the reacted monomer is conducted at low temperatures (less than about 100° C.) to avoid destruction of the Mannich adduct units. In order to attach the pendant Mannich adduct units to the primary polymer or to the polymerizable monomer, the primary polymer or polymerizable monomer must have an active site in the structure. Additionally such active sites must contain at least one hydrogen atom of pronounced reactivity which will undergo a Mannich reaction. An example of an active site is shown in Equation 1; its role in a Mannich reaction is illustrated in Equation 2. A description of what is referred to as an active site containing a hydrogen atom of pronounced activity is provided in the reference text. Generally the active sites can be methyl or methylene and substituted methylene radicals alpha positioned from a ketone, aldehyde, ester, or carboxylic acid. Possible substitution groups for the substituted methylene radical are the halides and lower alkyl ($C_{1-3}$) groups. However, methyl or methylene radicals, which are not substituted, are preferred for economic reasons.

In the practice of my invention, the active alpha-positioned site should contain more than one hydrogen atom, even though only one hydrogen atom of pronounced reactivity is sufficient for the compound to undergo a Mannich reaction. To form an ethylenically unsaturated unit on decomposition of the Mannich adduct unit, two hydrogens are required on the active site because the condensation reaction with the amine and formaldehyde will remove one hydrogen atom from the active site; and the destruction of the Mannich adduct unit on the application of heat removes another. Thus, when only one hydrogen atom is present on the active site I cannot form a polymer which will decompose to yield an ethylenically unsaturated unit; and more particularly, a pendant vinyl ketone linkage for crosslinking. For example, when malonic acid is reacted in a Mannich reaction, the single hydrogen atom which forms the active reaction site is removed during the (condensation) reaction. When such product having the Mannich adduct unit attached is heated, an ethylenically unsaturated unit does not form between the adjacent methylene radical and the active site for want of available electrons, and the product will not crosslink without an addition of a crosslinking agent. As will be evident to those skilled in the art, the hydrogen atoms contained on the active site are generally activated by a ketone, carboxyl, ester, or aldehyde unit; however, usually only one of the hydrogen atoms contained in the active site is sufficiently reactive to undergo a Mannich reaction. The preferred hydrogen activating group is the ketone. Groups other than the ketone, such as for example, aldehyde, ester, and acid groups, generally require an electron withdrawing unit such as a nitro, nitrile, ketone, or another acid unit. In addition, this electron withdrawing unit must be in such a position in the compound that it will sufficiently activate a hydrogen atom contained on the active alpha-positioned site.

The polymerizable monomers are those compounds which contain the active alpha-positioned site and can be polymerized to form a homopolymer, copolymer, or interpolymer under polymerizing conditions. The polymerizable monomers include methyl and lower alkyl vinyl ($C_{1-4}$) ketones or the N-3 oxyhydrocarbon acrylamides or substituted acrylamides, such as for example, those referred to in U.S. Pat. 3,277,056 having the formula

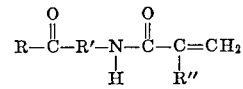

wherein R and R" are each selected from the class consisting of hydrogen and lower alkyl radicals and R' is selected from the group consisting of ethylene and a lower alkyl-substituted ethylene radical. For efficiency, the N–3 oxyhydrocarbon acrylamide and substituted acrylamides as the polymerizable monomer should not contain more than about 15 carbon atoms in the structure. Monomers having more than about 15 carbon atoms tend to be less reactive and can often cause difficulty in the polymerization reactions. N–3 oxyhydrocarbon acrylamides and substituted acrylamides are preferred as the polymerizable monomer. These compounds have excellent stability in the reaction and yet are readily reactable with other polymerizable unsaturated monomers. Lower alkyl vinyl ketones, and particularly methyl vinyl ketones are not preferred because they are relatively unstable and break down in a polymerization reaction. The active site, on breakdown, is often destroyed and therefore renders it impossible for forming Mannich adduct units thereon. In many instances, inhibitors are used to prevent such breakdown.

The polymerizable unsaturated compounds are generally the ethylenically unsaturated compounds or those compounds having a vinyl group incorporated therein. The polymerizable unsaturated compounds are unlike the polymerizable monomers in that they do not contain an active alpha-positioned site. Typical polymerizable ethylenically unsaturated compounds which can be employed are ethylene, propylene, and butadiene. I prefer to use the polymerizable vinyl monomers, such as the esters of unsaturated alcohols or unsaturated acids, vinyl cyclic compounds, unsaturated ethers, unsaturated ketones, unsaturated amides and unsaturated aliphatic hydrocarbons, and the like as the polymerizable unsaturated compound. These compounds are generally highly reactive for easy polymerization and generally make good coatings. Examples of unsaturated alcohols include allyl, vinyl, and methylvinyl. Examples of the unsaturated acids include methacrylic, phenoacrylic, crotonic, malonic, and adipic. Examples of the vinyl cyclic compounds include styrene, substituted styrenes, divinyl benzene, and N-vinyl pyrollidone; unsaturated ethers would include methyl vinyl, ethyl vinyl, cyclohexyl vinyl, octylvinyl, allyl ethyl, and diallyl ether; and the unsaturated ketones would include methyl and lower alkyl vinyl ketones.

In general, the polymerizable unsaturated compounds should not contain more than 20 carbon atoms. When more than 20 carbon atoms are included in the unsaturated unit, the unit often becomes less reactive, and therefore, less satisfactory for polymerization. For efficiency and for producing polymers best suited for coating compositions, the polymerizable unsaturated compounds usually should not have more than 12 carbon atoms. Additionally, the increased carbon content in the polymer tends to decrease the dispersibility of the polymer.

In producing the polymer of this invention, I prefer to incorporate a substantial proportion of lower alkyl acrylates as the polymerizable unsaturated compound in the backbone of the polymer. By a "lower alkyl acrylate," I mean and refer to the acrylic and substituted acrylic acid esters of lower alkyl ($C_{1-8}$) alkanols. The alkyl acrylates are reactive and easily polymerized. Furthermore, the lower alkyl acrylate resins have substantial durability and are excellent for coatings. One preferred polymer includes a mixture of N-3 oxyhydrocarbon acrylamides or substituted acrylamides or lower alkyl vinyl ketones with at least one lower alkyl acrylate.

It is well known that ammonia, primary, and secondary amines are operable and widely used in the Mannich reaction. In practicing my invention, however, I prefer not to use ammonia or a primary amine but restrict the amine to a lower alkyl ($C_{1-4}$) cycloaliphatic, aromatic, or heterocyclic secondary amine. Examples of advantageous lower alkyl amines include dimethylamine and diethylamine. A typical advantageous cyclic amine is piperidine, and a typical advantageous heterocyclic amine is morpholine. Ammonia and primary amines are not generally suited for purposes of my invention because the hydrogen atoms on the primary amine and ammonia react to completion with the active alpha-positioned sites on the monomer or primary polymer and often tend to cause gelation. The gelation is caused by cross-linking through the active sites attached to the polymer and the nitrogen atom of the primary amine or ammonia. Two active sites are joined through the nitrogen atom of the primary amine, and three are joined when ammonia is used. Thus, the degree of gelation and crosslinking is dependent on the number of hydrogen atoms that can react with an active site. The secondary amine, having only one replaceable hydrogen, reacts with only one active site and usually does not produce gelation of the polymer.

By a salt-forming acid, I refere to the acids which, when reacted with the secondary amine as previously described form an amine salt. Generally the acids are monobasic, dibasic, and polybasic acids such as hydrochloric, nitric, acetic, and hydrobromic acid. Preferably, weak acids having a pKa within a range of about the same as that of acetic acid are employed in forming the amine salt because these acids create less of a corrosion problem than do acids with a high pKa, such as hydrochloric acid and sulfuric acid (in concentrations suitable for forming the salt). The acids, when reacted with the amine, form the salt which then becomes highly electronegative or cationic and is sufficiently ionic for rendering a material water dispersible. The amine salt, when used in the Mannich reaction and when present in a sufficient amount in the polymer, is sufficiently ionic to render the polymer water dispersible. In carrying out the Mannich reaction, I can react the acid with the amine and form an amine salt and thereafter react the amine salt in the Mannich reaction; or I can add the acid subsequent to carrying out the Mannich reaction. Preferably, and for reasons of efficiency, the amine salt is formed prior to its use in carrying out the Mannich reaction.

I have described polymers produced according to my invention as being readily water dispersible. By some standards, it could be said that the polymers were even water soluble. Therefore, the term "water dispersible" should be construed in some instances as including the term "water soluble." By substantially water dispersible, I mean that at least 5 parts of the polymer should disperse in 95 parts of water at 75° F. Generally from about 25 to 35, and sometimes even more, parts of polymer readily disperse in 65 to 75 parts of water at 75° F.

Substantial water dispersibility of the polymer is usually achieved by including in the polymer a sufficient number of active sites of Mannich adduct units for rendering the polymer water dispersible. Generally from about 5% of the polymerizable monomer by weight of the polymer will provide a sufficient number of active sites which, when treated in a Mannich reaction, provide a sufficient number of Mannich adduct units for rendering the polymer readily water dispersible. Less than 5% of the polymerizable monomer is generally not sufficient for providing sufficient sites for ultimately producing a water disperisble polymer. Preferably, I incorporate from 15% to 40% of the polymerizable monomer by weight in the resultant polymer.

Although not intending to be bound by theory, it is believed that the key to the synthesis of a water dispersible polymer is to uniformly space the position of the Mannich adduct units along the backbone of the polymer. Additionally, the uniform spacing usually produces on decomposition of the Mannich adduct units a thermoset resin having substantially uniform crosslinking. When the pendant Mannich adduct units are non-uniformly grouped along the backbone of the polymer, only a portion of the polymer is usually water dispersible. Portions of the polymer are generally water insoluble (less than 5 parts of polymer disperses in 95 parts water). Usually nonuniform or grouped pendancy of the adduct units occurs when the reactivity of the polymerizable monomer is substantially different from the polymerizable unsaturated compound. For example, it is expected that "bunching" would occur if the monomer was a vinyl ketone and the polymerizable unsaturated compound was allyl alcohol or ethylene because of the difference in reactivity of the reactants. Moreover, it is expected that bunching of the pendant Mannich adduct units at one end of the polymer would affect the physical properties of the crosslinked polymer. Crosslinking would usually occur nonuniformly leaving portions of the backbone of the polymer substantially free of crosslinking. Substantially uniform spacing of the active sites for subsequent formation of pendant Mannich adduct units and uniform crosslinking is generally obtained when I react a vinyl ketone with another polymerizable unsaturated compound having a vinyl unit such as, for example, the alkyl acrylates.

An advantageous feature of the water dispersible polymers produced in accordance with this invention is that they can be formed into coating and impregnating compositions. These compositions can be used as surface coatings, film-forming coatings, or as an additive to other coating compositions. For effective coating or impregnating work, coating compositions generally comprise from about 1% to about 70% of water dispersible polymer by weight of the coating composition with the remainder of the coating composition being water. I can also prepare coating compositions having a mixture of water and water-miscible liquids, for example, aliphatic alcohols, ethers, ketones; but such compositions often require more of the mixture than does the composition when water is used alone. Coating compositions containing less than 1% polymer by weight of the coating composition are sometimes disadvantageous because of the large amount of liquid carrier which must be removed in order to obtain sufficient resin on the substrate. Compositions having more than 70% polymer by weight of the composition are usually not preferred because these compositions generally are not as easily worked or handled as compositions having less polymer.

Additionally, the polymers can be used in forming electrocoating bath compositions comprising aqueous solutions of about 1% to about 50% of the polymer by weight of the bath, the remainder being water. It is understood that conventional additives for electrocoating bath compositions which facilitate the application of the coating or improve the physical properties of the film, coating, and the like, can be used in my electrocoating bath compositions.

It is expected that various acid binding agents can also be added to the coating or bath compositions to prevent possible injury to the substrate. Illustration of such compounds include borax, magnesium hydroxide, pyridine, aniline, and weakly basic substances such as sodium acetate, and other buffers. Acetic acid, phthalic acid, or other mild acids can also be present if desired.

If desired, it is expected that other adjuvants can be added to the bath compositions for the purpose of facilitating the application of the polymer of for purposes of their own specific function. Illustrations of such adjuvants are magnesium sulfate, Japan wax, dextrine, gums, glues, china clay, tallow soaps, and carnauba wax.

I have previously stated that the Mannich adduct unit is electronegative. The electronegative unit can also be referred to as cationic. It is believed that because of the cationic nature of the Mannich adduct unit it would tend to reduce bacterial and nematocidal attack to the substrates on application of the polymer.

In accordance with the practice of the invention, the compositions can be applied to a substrate by such conventional means as brushing, dipping, and spraying techniques.

In addition to the conventional means of application, bath compositions containing the polymer compositions can be applied by the relatively new process of electrodeposition. Broadly, this is a process for electrocoating a cathode which comprises using the electrocoating bath composition, establishing and maintaining the bath in an electrical contact with an anode and cathode passing direct current through the bath at a potential sufficiently high for causing electrodeposition of the polymer composition. The electrodeposition processes are known in the art, and I refer to U.S. Pat. 3,230,162.

Subsequent to the application of coating compositions, the polymer is heated to a temperature sufficient to drive off the secondary amine and acid. By appropriately selecting the secondary amine and acid, it is often possible to control the decomposition temperature of the Mannich adduct unit. Usually, the decomposition temperatures are from about 100° C. to about 300° C.; but for reasons of efficiency, I prefer to use the lower temperatures in the decomposition step. Dimethylamine and acetic acid are preferred because Mannich adduct units containing these components generally decompose at a temperature of about 120° C.

On liberation of the secondary amine and acid, a polymer having a vinyl ketone linkage pendant from the polymer is produced. The vinyl ketone linkage is highly reactive and provides a self-crosslinking or self-curing mechanism for cross-linking the copolymer to form a thermoset resin. By the term "self-crosslinking" or "self-curing," I mean that the polymer will cure on the application of heat without adding any crosslinking agents whatsoever. Usually, the temperature at which the decomposition of a Mannich adduct unit occurs to liberate the secondary amine and acid is sufficient to cause the vinyl ketone linkage to react, cross-link, and thus form a thermoset resin. The decomposition step and crosslinking step is herein referred to as the "curing step." The lowest temperature in the curing step is that which will bring about substantial decomposition of the pendant Mannich adduct units. The upper temperature-time parameters for curing the polymer are dependent on the thermostability of the polymer. The curing temperature usually is inversely in proportion to the time required in the curing step. The polymer, when cured at high temperatures, usually requires less time than at low temperatures. The time-temperature parameter for the curing step should be sufficient to bring about substantial cure of the resin without substantial decomposition of the polymer. I prefer to cure the polymer at a temperature of about 100° to 150° C. and for a time from about 10 to 30 minutes.

The following examples are provided to illustrate specific embodiments of this invention and are not intended to restrict the scope thereof. All parts are by weight, all percentages are weight percentages, and all temperatures are in degrees centigrade unless otherwise specified.

EXAMPLE 1

An interpolymer of diacetone acrylamide, ethyl acrylate, methyl methacrylate is produced by charging 20 parts of diacetone acrylamide, 60 parts of ethyl acrylate, and 20 parts of methyl methacrylate to a pressure vessel containing 100 parts of isopropanol. These components are heated to a temperature of about 120° and catalyzed with 0.5% of benzoyl peroxide. The polymerization is completed in about 90 minutes. Then, the batch is cooled to 70°, and 4.3 parts of paraformaldehyde (about 10% excess of the stoichiometric requirement) and 12.6 parts of dimethylamine acetate is added to the vessel and mixed at the temperature of about 70° for 10 hours. At the end of the reaction, the resin is clear and fully water dispersible (in about a 1 part water-1 part resin mixture).

EXAMPLE 2

Twenty parts of diacetone acrylamide is mixed with 4.3 parts of paraformaldehyde (about 10% in excess of the stoichiometric requirement), about 120 parts of isopropanol as a carrier for the solvent polymerization, and 12.6 parts of dimethylamine acetate and is charged to a vessel and reacted at a temperature of 60° for about 6 hours. At the completion of the reaction, 60 parts of ethyl acrylate and 20 parts of methyl methacrylate is charged to the vessel, and the subsequent mixture is agitated and polymerized by the employment of a catalyst, benzoyl peroxide, at a temperature of 120°. At the completion of the polymerization reaction, the resin is water soluble.

EXAMPLE 3

Clear, hard, highly crosslinked films with excellent mar-resistance are obtained from coating compositions containing the resin produced in accordance with Example 1. The resin of Example 1 is diluted with water to yield a coating composition having 50% non-volatile matter. The resultant coating composition is applied to steel panels with a brush, and the coated steel panels are baked at a temperature of 250° F. for about 30 minutes. The films produced on completion of the bake cycle are hard and durable. When the coatings were rubbed with methyl ethyl ketone, little film is removed showing that significant crosslinking took place.

The foregoing examples illustrate the preferred embodiments of practicing this invention, but it is understood that other embodiments can be employed and remain within the scope of the following claims.

Having thus described the invention, I claim:

1. A process for forming a water dispersible polymer which comprises the steps of:
   (a) polymerizing a polymerizable ethylenically unsaturated compound having from 2–12 carbon atoms and not containing an active alpha-positioned site with a polymerizable monomer having an active site with a hydrogen atom sufficiently active for undergoing a Mannich reaction, said monomer selected from the group consisting of a lower alkyl vinyl ketone and an acrylamide having the structural formula:

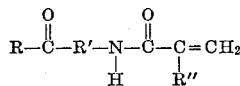

wherein R and R" are each selected from the class consisting of hydrogen and lower alkyl radicals and R' is selected from the class consisting of ethylene and a lower alkyl-substituted ethylene radical, said polymerizable monomer being present in a proportion of from about 5–40% by weight of the polymer; and
   (b) attaching a Mannich adduct salt onto said polymerizable monomer by reacting said polymer in a Mannich reaction, the amine used in said Mannich reaction being a secondary amine selected from the group consisting of lower alkyl, cycloaliphatic, and aromatic secondary amines and the aldehyde being formaldehyde.

2. The process of claim 1 wherein said polymerizable monomer is present in a proportion of from 15–40% by weight of the polymer.

3. The process of claim 2 wherein said polymerizable unsaturated compound is a lower alkyl acrylate.

4. The process of claim 3 wherein said polymerizable monomer is diacetone acrylamide.

5. The process for forming a water dispersible polymer which comprises the steps of attaching a Mannich adduct salt onto a polymerizable monomer having an active alpha-positioned site with a hydrogen atom sufficiently active for undergoing a Mannich reaction, by reacting in a Mannich reaction, the amine used in said Mannich reaction being a secondary amine selected from the group consisting of a lower alkyl, cycloaliphatic, and aromatic secondary amines and the aldehyde being formaldehyde, said monomer selected from the group consisting of a lower alkyl vinyl ketone and an acrylamide having the structural formula:

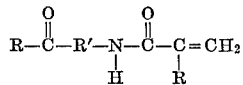

wherein R and R" are each selected from the class consisting of hydrogen and lower alkyl radicals and R' is selected from the class consisting of ethylene and a lower alkyl-substituted ethylene radical, and then polymerizing with a polymerizable ethylenically unsaturated compound having from 2–12 carbon atoms and not containing an active alpha-positioned site at a temperature not substantially in excess of 100° C., and wherein said polymerizable monomer is present in a proportion of from 5–40% excluding said Mannich adduct salt by weight of the polymer.

6. The process of claim 5 wherein said polymerizable unsaturated compound is a lower alkyl acrylate.

7. The process of claim 6 wherein said polymerizable monomer is diacetone acrylamide.

8. A water dispersible polymer having a sufficient number of Mannich adduct salts in the polymer for rendering it water dispersible, said polymer obtained by the polymerization of a polymerizable ethylenically unsaturated compound having from 2–12 carbon atoms in the structure and not containing an active alpha-positioned site with from 5–40% by weight of the polymer of a polymerizable monomer having an active alpha-positioned site with a hydrogen atom sufficiently active for undergoing a Mannich reaction selected from the group consisting of a lower alkyl vinyl ketone and an acrylamide having the structural formula:

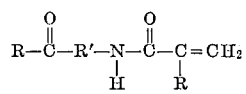

wherein R and R" are each selected from the class consisting of hydrogen and lower alkyl radicals and R' is selected from the class consisting of ethylene and a lower alkyl-substituted ethylene radical, said polymerizable monomer being present in a proportion of from about 5–40% by weight of the polymer, the Mannich adduct salt being pendant from said monomer, the amine used in forming said Mannich adduct salt being a secondary amine salt selected from the group consisting of lower alkyl cycloaliphatic and aromatic secondary amine salts and the aldehyde being formaldehyde.

9. The product of claim 8 wherein said polymerizable unsaturated compound is a lower alkyl acrylate.

10. The product of claim 9 wherein said polymerizable monomer is diacetone acrylamide.

References Cited

UNITED STATES PATENTS

| 2,846,406 | 8/1958 | Kleiner et al. | 260—2.1 |
| 3,398,103 | 8/1968 | Kuhlkamp et al. | 260—2.5 |
| 3,402,133 | 9/1968 | Kuhlkamp et al. | 260—2.5 |

WILLIAM SHORT, Primary Examiner

L. L. LEE, Assistant Examiner

U.S. Cl. X.R.

117—132 B, 161 UN, 161 UZ; 204—23; 260—29.6 R, 29.6 H, 33.2 R, 33.4 R, 63 N, 86.1, 89.7 R